United States Patent
Yoshino et al.

(10) Patent No.: US 8,798,130 B2
(45) Date of Patent: Aug. 5, 2014

(54) IMAGE PROCESSING APPARATUS, ELECTRONIC DEVICE, IMAGE PROCESSING METHOD, AND STORAGE MEDIUM STORING IMAGE PROCESSING PROGRAM

(75) Inventors: Koichiro Yoshino, Tokyo (JP); Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 748 days.

(21) Appl. No.: 12/954,986

(22) Filed: Nov. 29, 2010

(65) Prior Publication Data
US 2011/0069762 A1 Mar. 24, 2011

Related U.S. Application Data

(63) Continuation of application No. PCT/JP2009/059485, filed on May 19, 2009.

(30) Foreign Application Priority Data

May 29, 2008 (JP) ................................. 2008-140905

(51) Int. Cl.
*H04B 1/66* (2006.01)
*G06T 7/00* (2006.01)
*G06T 7/20* (2006.01)
*H04N 5/232* (2006.01)

(52) U.S. Cl.
CPC ............ *G06T 7/0026* (2013.01); *G06T 7/2013* (2013.01); *H04N 5/23248* (2013.01)
USPC ....................................................... 375/240

(58) Field of Classification Search
USPC ............................................ 375/240.16, 240
See application file for complete search history.

(56) References Cited

U.S. PATENT DOCUMENTS 5,157,732 A * 10/1992 Ishii et al. .................... 382/107
5,235,434 A * 8/1993 Wober ......................... 358/448
(Continued)

FOREIGN PATENT DOCUMENTS

JP  04-213973 A  8/1992
JP  04-241832 A  8/1992
(Continued)

OTHER PUBLICATIONS

Shapiro et al., Chapter 7 Texture, 2000, Computer Vision, Mar. 2000, pp. 1-14.*

(Continued)

*Primary Examiner* — Sath V Perungavoor
*Assistant Examiner* — Peter D Le
(74) *Attorney, Agent, or Firm* — Holtz Holtz Goodman & Chick PC (57) ABSTRACT

An image processing apparatus that performs image registration processing between a plurality of images through a motion vector calculation sets a plurality of motion vector measurement regions on an image, calculates a motion vector in each of the plurality of motion vector measurement regions, specifies a region of interest on the image, determines whether or not each of the plurality of motion vector measurement regions is included in the region of interest, calculates a contribution of each motion vector such that the contribution of the motion vector of a motion vector measurement region included in the region of interest is larger than the contribution of the motion vector of a motion vector measurement region not included in the region of interest, and determines an inter-image motion vector by integrating the motion vectors calculated respectively in the plurality of motion vector measurement regions in accordance with the calculated contribution.

14 Claims, 11 Drawing Sheets

(56) References Cited

U.S. PATENT DOCUMENTS

| | | | | |
|---|---|---|---|---|
| 5,546,129 A * | 8/1996 | Lee | | 375/240.16 |
| 5,612,743 A * | 3/1997 | Lee | | 375/240.16 |
| 5,619,281 A * | 4/1997 | Jung | | 348/699 |
| 5,835,614 A * | 11/1998 | Aoyama et al. | | 382/104 |
| 6,026,217 A * | 2/2000 | Adiletta | | 709/247 |
| 6,310,920 B1 * | 10/2001 | Ogawa | | 375/240.17 |
| 6,366,699 B1 * | 4/2002 | Kuwano et al. | | 382/199 |
| 6,442,203 B1 * | 8/2002 | Demos | | 375/240.16 |
| 6,539,106 B1 * | 3/2003 | Gallarda et al. | | 382/149 |
| 6,580,812 B1 * | 6/2003 | Harrington | | 382/107 |
| 6,687,394 B1 * | 2/2004 | Mori | | 382/132 |
| 6,748,113 B1 * | 6/2004 | Kondo et al. | | 382/232 |
| 6,792,203 B1 * | 9/2004 | Ide et al. | | 396/65 |
| 6,864,909 B1 * | 3/2005 | Horowitz | | 348/14.12 |
| 2001/0017944 A1 * | 8/2001 | Kalevo et al. | | 382/268 |
| 2001/0022857 A1 * | 9/2001 | Kondo et al. | | 382/268 |
| 2002/0076106 A1 * | 6/2002 | Kondo et al. | | 382/194 |
| 2002/0080878 A1 * | 6/2002 | Li | | 375/240.11 |
| 2002/0131647 A1 * | 9/2002 | Matthews | | 382/268 |
| 2002/0181706 A1 * | 12/2002 | Matsumura et al. | | 380/205 |
| 2003/0103568 A1 * | 6/2003 | Lee et al. | | 375/240.16 |
| 2003/0118106 A1 * | 6/2003 | Kondo et al. | | 375/240.16 |
| 2003/0122853 A1 * | 7/2003 | Kim | | 345/660 |
| 2003/0215014 A1 * | 11/2003 | Koto et al. | | 375/240.16 |
| 2004/0062423 A1 * | 4/2004 | Doi | | 382/118 |
| 2004/0105598 A1 * | 6/2004 | Kondo et al. | | 382/307 |
| 2004/0190624 A1 * | 9/2004 | Kondo et al. | | 375/240.16 |
| 2004/0252230 A1 * | 12/2004 | Winder | | 348/402.1 |
| 2004/0252759 A1 * | 12/2004 | Winder et al. | | 375/240.12 |
| 2004/0252764 A1 * | 12/2004 | Hur et al. | | 375/240.16 |
| 2005/0010082 A1 | 1/2005 | Nishimura et al. | | |
| 2005/0088537 A1 * | 4/2005 | Nakamura et al. | | 348/223.1 |
| 2006/0083305 A1 * | 4/2006 | Dougherty et al. | | 375/240.12 |
| 2006/0184003 A1 * | 8/2006 | Lewin et al. | | 600/414 |
| 2006/0222255 A1 * | 10/2006 | Mizuno et al. | | 382/240 |
| 2007/0003151 A1 * | 1/2007 | Kawahara | | 382/239 |
| 2007/0009034 A1 * | 1/2007 | Tulkki | | 375/240.16 |
| 2007/0140589 A1 * | 6/2007 | Umeda | | 382/275 |
| 2007/0261075 A1 * | 11/2007 | Glasberg et al. | | 725/22 |
| 2008/0002774 A1 * | 1/2008 | Hoshino et al. | | 375/240.16 |
| 2008/0025403 A1 * | 1/2008 | Sato et al. | | 375/240.16 |
| 2008/0151080 A1 * | 6/2008 | Osaka et al. | | 348/241 |
| 2008/0310513 A1 * | 12/2008 | Ma et al. | | 375/240.16 |
| 2008/0310727 A1 * | 12/2008 | Wu et al. | | 382/190 |
| 2009/0073275 A1 * | 3/2009 | Awazu | | 348/222.1 |
| 2009/0102771 A1 * | 4/2009 | Sugisawa et al. | | 345/89 |
| 2009/0110075 A1 * | 4/2009 | Chen et al. | | 375/240.16 |
| 2009/0167959 A1 * | 7/2009 | Nakamura et al. | | 348/699 |
| 2009/0273707 A1 * | 11/2009 | Miyoshi | | 348/441 |
| 2010/0020341 A1 * | 1/2010 | Enjuji | | 358/1.9 |
| 2010/0201878 A1 * | 8/2010 | Barenbrug et al. | | 348/563 |

FOREIGN PATENT DOCUMENTS

| | | |
|---|---|---|
| JP | 2006-280792 A | 10/2006 |
| JP | 2007-043285 A | 2/2007 |
| JP | 2007-129587 A | 5/2007 |

OTHER PUBLICATIONS

International Search Report and Written Opinion dated Jun. 16, 2009 (in English) in counterpart International Application No. PCT/JP2009/059485.

* cited by examiner

IMAGE PROCESSING APPARATUS, ELECTRONIC DEVICE, IMAGE PROCESSING METHOD, AND STORAGE MEDIUM STORING IMAGE PROCESSING PROGRAM

CROSS REFERENCE TO RELATED APPLICATIONS

This application is a continuation of International Patent Application No. PCT/JP2009/059485, filed on May 19, 2009, which claims the benefit of Japanese Patent Application No. JP 2008-140905, filed on May 29, 2008, which is incorporated by reference as if fully set forth.

FIELD OF THE INVENTION

This invention relates to a technique for performing registration processing between a plurality of images using a motion vector calculation.

BACKGROUND OF THE INVENTION

A correlation method and a block matching method based on a correlation calculation are known as conventional methods of detecting motion vectors between a plurality of images. The block matching method is a method of dividing an input image signal into a plurality of blocks of an appropriate size (8 pixels×8 lines, for example), calculating differences with pixels in a fixed range of a previous frame in units of these blocks, and searching for a block having a smallest sum of absolute values of the differences. A relative deviation between the images represents a motion vector of the corresponding block. The motion vectors of the respective blocks are then integrated, whereupon an inter-frame representative motion vector is calculated and used to perform final image registration.

A method of determining a sum of squared intensity difference (SSD), which is a sum of squares of a difference between pixel values, and a method of determining a sum of absolute intensity difference (SAD), which is a sum of absolute values of a difference between pixel values, are known as methods of searching for a block having a high correlation during block matching. In these methods, the correlation (degree of coincidence) is determined to be steadily higher as the SSD or SAD decreases. In a matching reference block region I and a subject block region I', when pixel values of pixel positions $p \in I$ and $q \in I'$ (where p, q are quantities having two-dimensional values, I, I' are two-dimensional regions, and $p \in I$ indicates that a coordinate p is included in the region I) are set as Lp, Lq, respectively, SSD and SAD are respectively expressed by following Equations (1) and (2).

$$SSD(I, I') = \sum_{p \in I,\ q \in I'} (Lp - Lq)^2 \quad (1)$$

$$SAD(I, I') = \sum_{p \in I,\ q \in I'} \|Lp - Lq\| \quad (2)$$

Further, a method employing a normalized cross-correlation (NCC) also exists. As a zero average correlation, average values Ave (Lp), Ave (Lq) of the pixels $p \in I$ and $q \in I'$ respectively included in the matching reference block region I and the subject block region I' are calculated, whereupon differences with pixel values included in the respective blocks are calculated using following Equations (3) and (4).

$$Lp' = \left. \frac{Lp - Ave(Lp)}{\sqrt{\frac{1}{n}\sum_{p \in I}(Lp - Ave(Lp))^2}} \right|_{p \in I} \quad (3)$$

$$Lq' = \left. \frac{Lq - Ave(Lq)}{\sqrt{\frac{1}{n}\sum_{q \in I'}(Lq - Ave(Lq))^2}} \right|_{q \in I'} \quad (4)$$

Next, the normalized cross-correlation NCC is calculated using a following Equation (5).

$$NCC = \Sigma Lp'Lq' \quad (5)$$

A block having a large normalized cross-correlation NCC is determined to be a block having a high degree of coincidence (a high correlation), whereupon a relative deviation between the blocks I' and I having the highest degree of coincidence is determined and set as the motion vector.

Figure 9:
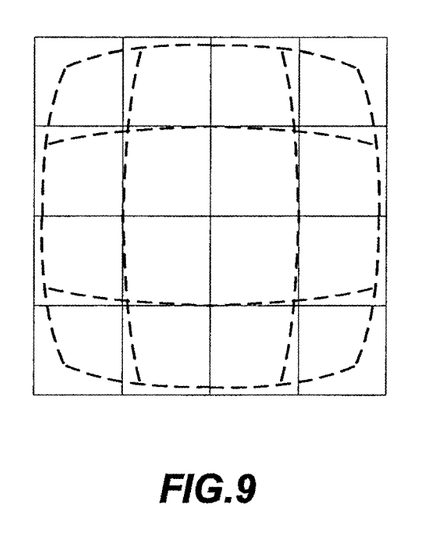
FIG. 9 is a view showing an example of an optical system exhibiting negative distortion.
Figure 10:
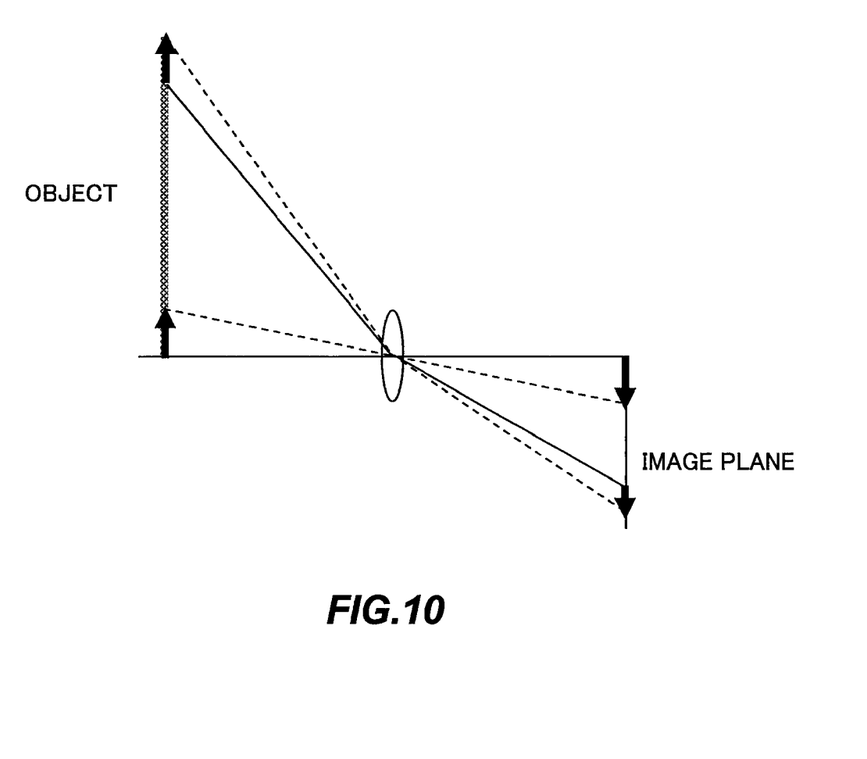
FIG. 10 is a view showing that an image formed on an image periphery is smaller than an image formed in an image center when an image is obtained using the optical system exhibiting negative distortion.

When a motion vector is calculated in relation to an object that may be considered to be a stationary plain surface or may be in the infinite distance and substantially no effect is received from optical system distortion, the motion vectors of the individual regions match an overall motion vector of the image. However, when an image is obtained using an optical system that exhibits large distortion over a wide field angle, an amount of distortion varies greatly according to an image height, and therefore the motion vector of the image varies greatly according to the image height even when an object that may be considered to be a plain surface or may be in the infinite distance moves horizontally. For example, when an image is obtained using an optical system exhibiting negative distortion (barrel-shaped distortion), as in the case shown in FIG. 9, an image formed on an image periphery is smaller than an image formed in an image center, as shown in FIG. 10. It should be noted that the image height is a distance from an optical axis on an image surface.

As a result, it becomes difficult to perform image registration at a central portion and a peripheral portion of an image simultaneously when performing registration of a plurality of images, for example. To solve this problem, a technique of detecting a motion vector using an image in relation to which the optical system distortion has already been corrected is known (JP2007-129587A).

SUMMARY OF THE INVENTION

An image processing apparatus of an aspect of the present invention for performing image registration processing between a plurality of images through a motion vector calculation comprises a motion vector measurement region setting unit that sets a plurality of motion vector measurement regions for determining motion vectors on an image, a motion vector calculation unit that calculates a motion vector in each of the plurality of motion vector measurement regions, a region specification unit that specifies a region of interest by user interest on the image, a positional relationship determination unit that determines whether or not each of the plurality of motion vector measurement regions is included in the region of interest, a contribution calculation unit that calculates a contribution of each motion vector such that the contribution of the motion vector of a motion vector measurement region included in the region of interest is larger than the contribution of the motion vector of a motion vector measurement region not included in the region of interest, and a motion vector integration unit that determines an inter-image motion vector by integrating the motion vectors calculated respectively in the plurality of motion vector measurement regions in accordance with the calculated contribution.

A storage medium of another aspect of the present invention stores an image processing program for causing a computer to execute registration processing between a plurality of images through a motion vector calculation. The image processing program comprises the steps of setting a plurality of motion vector measurement regions for determining motion vectors on an image, calculating a motion vector in each of the plurality of motion vector measurement regions, specifying a region of interest by user interest on the image, determining whether or not each of the plurality of motion vector measurement regions is included in the region of interest, calculating a contribution of each motion vector such that the contribution of the motion vector of a motion vector measurement region included in the region of interest is larger than the contribution of the motion vector of a motion vector measurement region not included in the region of interest, and determining an inter-image motion vector by integrating the motion vectors calculated respectively in the plurality of motion vector measurement regions in accordance with the calculated contribution.

An image processing method of yet another aspect of the present invention for performing image registration processing between a plurality of images through a motion vector calculation comprises the steps of setting a plurality of motion vector measurement regions for determining motion vectors on an image, calculating a motion vector in each of the plurality of motion vector measurement regions, specifying a region of interest by user interest on the image, determining whether or not each of the plurality of motion vector measurement regions is included in the region of interest, calculating a contribution of each motion vector such that the contribution of the motion vector of a motion vector measurement region included in the region of interest is larger than the contribution of the motion vector of a motion vector measurement region not included in the region of interest, and determining an inter-image motion vector by integrating the motion vectors calculated respectively in the plurality of motion vector measurement regions in accordance with the calculated contribution.

DESCRIPTION OF THE PREFERRED EMBODIMENTS

Figure 1:
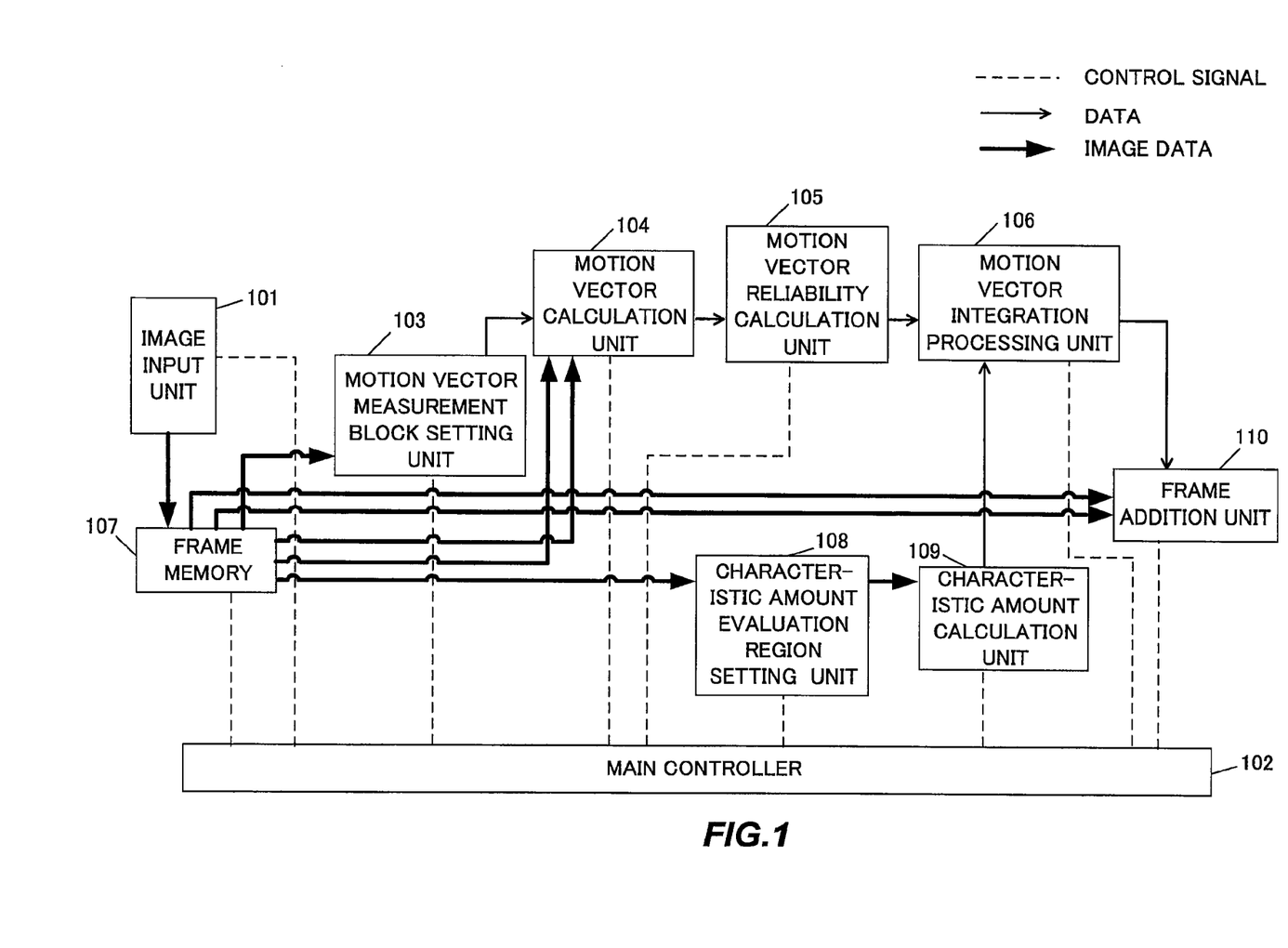
FIG. 1 is a block diagram showing the constitution of an image processing apparatus according to an embodiment.

FIG. 1 is a block diagram showing the constitution of an image processing apparatus according to an embodiment. In the figure, dotted lines denote control signals, thin lines denote the flow of data such as motion vectors and reliability values, and thick lines denote the flow of image data. The image processing apparatus according to this embodiment is installed in an electronic device that depends on a current or an electromagnetic field to operate correctly, such as a digital camera, a digital video camera, or an endoscope.

A main controller 102 is a processor that performs overall operation control on the apparatus, and employs a CPU such as a DSP (Digital Signal Processor), for example.

A plurality of images photographed at different times using an image pickup device or an external device not shown in the figures, for example, are input into an image input unit 101. The images of the plurality of frames input into the image input unit 101 are temporarily stored in a frame memory 107. Data for the plurality of frames stored in the frame memory 107 include data of a reference frame serving as a registration reference and data of a subject frame to be registered relative to the reference frame.

A motion vector measurement block setting unit 103 (to be referred to hereafter as a block setting unit 103) sets a predetermined plurality of motion vector measurement blocks on the reference frame stored in the frame memory 107. The motion vector measurement blocks are used when the reference frame and the subject frame are registered. Hereafter, the motion vector measurement blocks will be referred to simply as "blocks".

Figure 2:
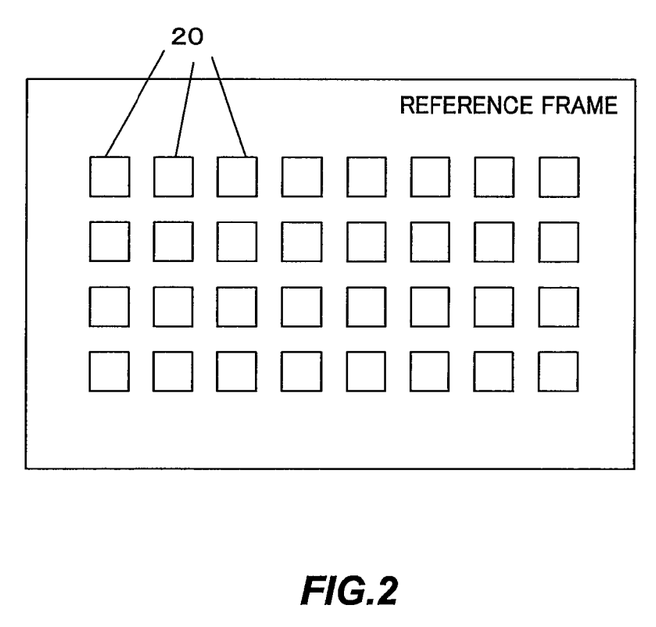
FIG. 2 is a view showing an example of blocks set on a reference frame.

FIG. 2 is a view showing an example of a plurality of blocks 20 set on the reference frame. In the example shown in FIG. 2, the blocks 20 are set on the reference frame in a lattice shape. Central coordinates of each block 20 serve as a start point of the motion vector.

A motion vector calculation unit 104 uses the image data of the reference frame and the subject frame stored in the frame memory 107 and data relating to the blocks set by the block setting unit 103 to calculate a block position of the subject frame having a high correlation with a block of the reference frame through block matching, in which a coincidence index value such as the aforementioned SSD, SAD, or NCC is calculated. This processing is executed on all of the blocks.

Central coordinates of the highly correlated block in the subject frame serve as an end point of the motion vector. Accordingly, a vector extending from the central coordinates of a block in the reference frame to the central coordinates of the highly correlated block in the subject frame serves as the motion vector. It should be noted that reference position coordinates are matched such that lower left edge positions of the reference frame and subject frame are set as origins, for example.

A motion vector reliability calculation unit 105 calculates a reliability value indicating the reliability of the motion vector determined by the motion vector calculation unit 104. The reliability may be any value that indicates the reliability of the calculated motion vector. For example, the reliability may be determined using a known method such as setting the reliability in accordance with a number of horizontal direction and vertical direction edges in the block or using the coincidence index value such as the SSD, SAD, or NCC itself.

A characteristic amount evaluation region setting unit 108 sets a plurality of characteristic amount evaluation regions by dividing the reference frame in the frame memory 107 into a plurality of regions. The characteristic amount evaluation regions will be described in detail below.

A characteristic amount calculation unit 109 calculates one or a plurality of characteristic amounts in relation to the characteristic amount evaluation regions set by the characteristic amount evaluation region setting unit 108. The characteristic amount is a parameter used to specify a region of interest, which is a region of the image in which a user has an interest, and will be described in detail below.

A motion vector integration processing unit 106 calculates a representative value of the motion vectors between the reference frame and the subject frame by integrating the data of a plurality of motion vectors using the characteristic amount information calculated by the characteristic amount calculation unit 109. A method of calculating the motion vector representative value will be described below.

A frame addition unit 110 performs frame addition processing on the basis of the image data of the reference frame and the subject frame stored in the frame memory 107 and correction vector data (the representative value of the inter-image motion vector) calculated by the motion vector integration processing unit 106.

It should be noted that the constitution shown in FIG. 1 is an example of frame addition, but moving image blur correction, in which the subject frame is registered relative to the reference frame using a correction vector, may be performed instead. In moving image blur correction, blur is decreased by correcting the subject frame relative to the reference frame using the correction vector.

Figure 3:
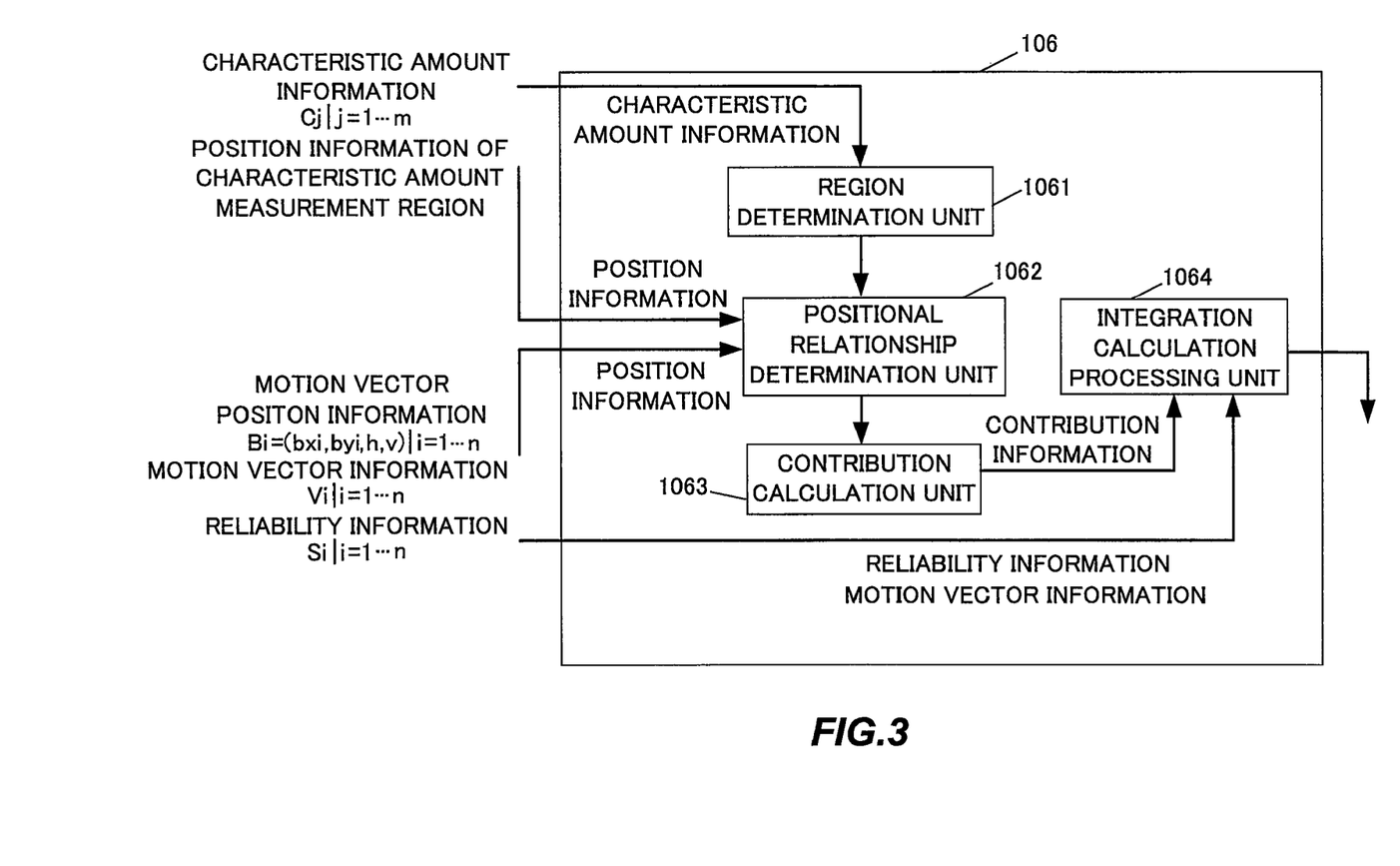
FIG. 3 is a view showing the constitution of a motion vector integration processing unit in detail.

FIG. 3 is a view showing the constitution of the motion vector integration processing unit 106 in detail. The motion vector integration processing unit 106 comprises a region determination unit 1061, a positional relationship determination unit 1062, a contribution calculation unit 1063, and an integration calculation processing unit 1064. It is assumed in the following description, for the purpose of simplification, that a single characteristic amount is used.

When m characteristic amount evaluation regions are set on the reference frame, the region determination unit 1061 specifies the region of interest in which the user has an interest using a total of m characteristic amounts $C_j$ (j=1, . . . , m) calculated from the respective characteristic amount evaluation regions.

The positional relationship determination unit 1062 uses position information relating to the characteristic amount evaluation regions and position information relating to the blocks set by the block setting unit 103 to determine the characteristic amount evaluation region to which each motion vector belongs. The contribution calculation unit 1063 uses the positional relationship information determined by the positional relationship determination unit 1062 to calculate a contribution of each motion vector. The contribution is a value indicating a weight of each motion vector used when the plurality of motion vectors are integrated in order to calculate the inter-image motion vector representative value.

The integration calculation processing unit 1064 calculates the representative value of the motion vectors between the reference frame and the subject frame on the basis of the reliability of each motion vector calculated by the motion vector reliability calculation unit 105, the contribution of each motion vector calculated by the contribution calculation unit 1063, and the respective motion vectors calculated by the motion vector calculation unit 104.

Figure 4:
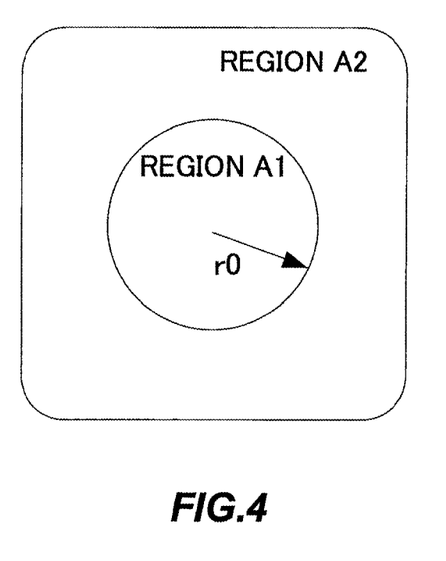
FIG. 4 is a view showing an example of a characteristic amount evaluation region.

Here, a case in which an average luminance of the characteristic amount evaluation region is used as the characteristic amount will be described. It is assumed in the following description, for the purpose of simplification, that two regions are set as characteristic amount evaluation regions, as shown in FIG. 4. On an image shown in FIG. 4, a central region in which a distance r from an image center (x0, y0) is $0 \leq r \leq r0$ is set as a characteristic amount evaluation region A1 (or simply, a region A1), and a peripheral region in which r0<r is set as a characteristic amount evaluation region A2 (or simply, a region A2). Further, the average luminance of the regions A1, A2 is L1, L2, respectively.

Figure 5A:
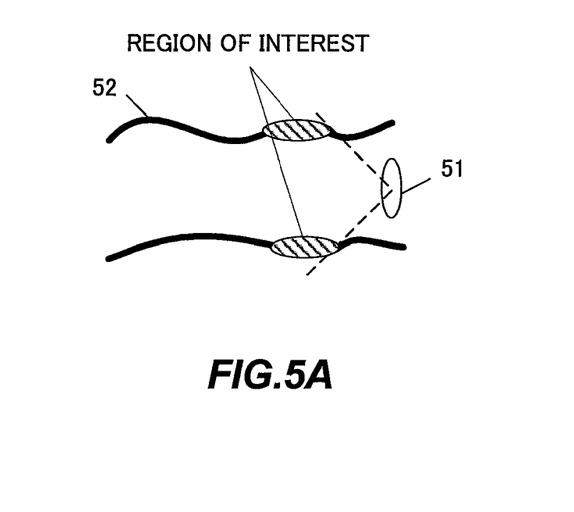
FIG. 5A shows a state in which a hollow pipe-shaped object is observed with an endoscope.
Figure 5B:
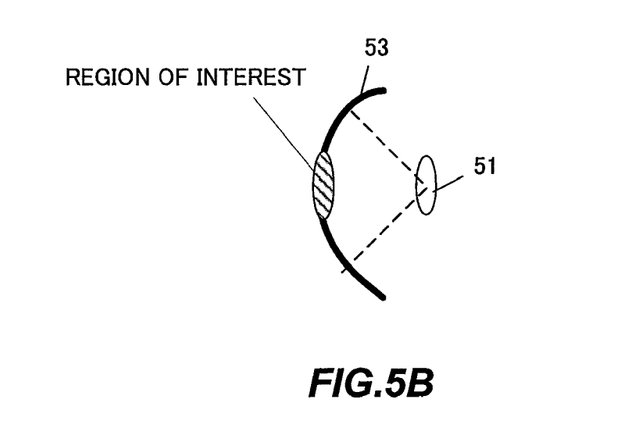
FIG. 5B shows a state in which an object that is close to a part of a spherical surface is observed with the endoscope.

FIGS. 5A and 5B are views showing two representative observation states occurring when the user observes an organism using an endoscope. FIG. 5A shows a state in which a hollow pipe-shaped object 52 (a pipe shape having an internal cavity) is observed through an image pickup unit 51 of the endoscope, and FIG. 5B shows a state in which an object 53 that is close to a part of a spherical surface is observed. Dotted lines in the figures indicate an angle of visibility of the image pickup unit. Further, a range that substantially overlaps the angle of visibility is illuminated by an illumination unit (not shown) provided in the vicinity of the image pickup unit 51.

As shown in FIG. 5A, when the hollow pipe-shaped object 52 is observed, an object positioned near the center of the image is much further from the image pickup unit 51 than an object positioned on a peripheral portion of the image. As the distance from the image pickup unit 51 increases, it becomes more and more difficult for light from the illumination unit (not shown) to reach the object, and therefore, when the entire image is viewed, as shown in FIG. 6A, the region A2 on the peripheral portion of the image is brighter than the region A1 in the central portion.

Figure 6A:
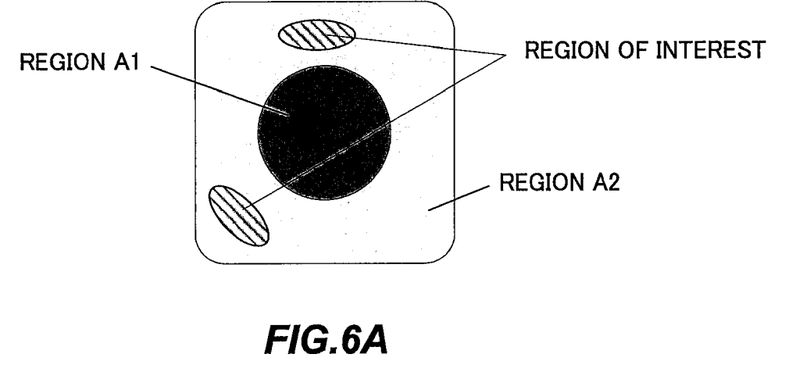
FIG. 6A is a view showing brightness on the image corresponding to an observation state shown in FIG. 5A.

In this case, the region in which the user has an interest is an internal wall surface of the hollow pipe-shaped object 52, and on an image surface shown in FIG. 6A, the region of interest is positioned in the characteristic amount evaluation region A2. The region determination unit 1061 compares the average luminance L1 of the region A1 with the average luminance L2 of the region A2 and determines that the region A2 having a larger luminance is the region of interest. Hence, as will be described below, the inter-frame motion vector representative value is calculated by increasing the contribution of the motion vectors included in the region A2, from among the motion vectors of the respective blocks, and in so doing, the region of interest can be registered reliably.

Figure 6B:
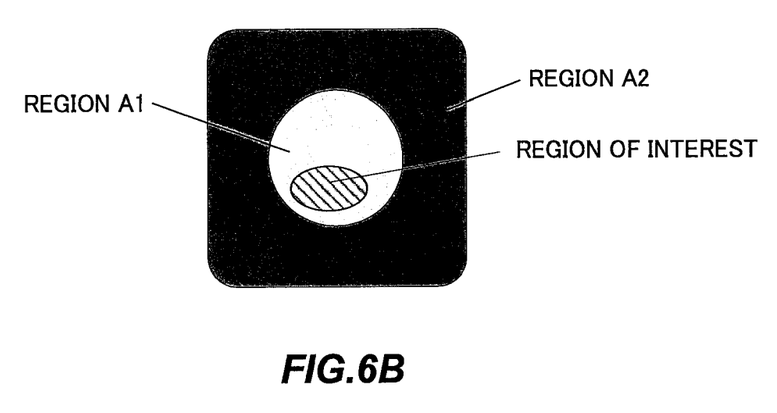
FIG. 6B is a view showing brightness on the image corresponding to an observation state shown in FIG. 5B.

Next, a case in which the object 53 that is close to a part of a spherical surface is observed, as shown in FIG. 5B, will be considered. In this case, the distance from the image pickup unit 51 to the object does not vary greatly between the central portion and the peripheral portion of the image. In this state, an image in which the region A1 in the central portion of the image is brighter than the region A2 in the peripheral portion, as shown in FIG. 6B, is typically obtained due to the effects of a light distribution of the illumination, vignetting of the optical system, and so on.

In this case, the user operates the endoscope such that the region of interest enters the region A1 positioned in the center of the image in order to observe the region of interest within a bright image including little distortion. The region determination unit 1061 compares the average luminance L1 of the region A1 to the average luminance L2 of the region A2 and determines that the region A1 having greater luminance is the region of interest. Next, as will be described below, the inter-frame motion vector representative value is calculated by increasing the contribution of the motion vectors included in the region A1, from among the motion vectors of the respective blocks, and in so doing, the region of interest can be registered reliably.

The positional relationship determination unit 1062 determines whether central coordinates (bxi, byi) of an $i^{th}$ block are included in the region A1 or the region A2. Here, assuming that the central coordinates of the image are (x0, y0), the central coordinates (bxi, byi) of the $i^{th}$ block are determined to be included in the region A2 when a relationship of a following Equation (6) is established and determined to be included in the region A1 when the relationship of Equation (6) is not established.

$$\sqrt{(bxi-x0)^2+(byi-y0)^2}>r0 \quad (6)$$

The contribution calculation unit 1063 sets the contribution of each motion vector such that the contribution of a motion vector of a block included in the region of interest is larger than the contribution of a motion vector of a block not included in the region of interest. When it is determined that the $i^{th}$ block is included in the region of interest, a contribution Ki is set at 1, and when it is determined that the $i^{th}$ block is not included in the region of interest, the contribution Ki is set at 0. For example, when the region determination unit 1061 determines that the region A1 is the region of interest and the $i^{th}$ block is determined to be included in the region A1, the contribution Ki of the $i^{th}$ block is set at 1, whereas when the $i^{th}$ block is determined to be included in the region A2, the contribution Ki is set at 0.

The integration calculation processing unit 1064 first compares the reliability Si of each motion vector, calculated by the motion vector reliability calculation unit 105, with a predetermined threshold S_Thr, and calculates a threshold-processed reliability STi on the basis of the comparison result. More specifically, when the reliability Si is equal to or smaller than the predetermined threshold S_Thr, STi=0 is set, and when the reliability Si is larger than the predetermined threshold S_Thr, STi=Si is set.

Next, the integration calculation processing unit 1064 calculates a representative value $V_{Frame}$ of the motion vectors between the reference frame and the subject frame using the threshold-processed reliability STi, the contribution Ki of each motion vector, and each motion vector Vi in accordance with a following Equation (7). It should be noted that a denominator on the right side is a normalization coefficient.

$$V_{Frame} = \frac{1}{\sum STi \sum Ki} \sum (STi \cdot Ki \cdot Vi) \quad (7)$$

According to Equation (7), when the motion vectors of the respective blocks are integrated to calculate the representative value $V_{Frame}$ of the motion vectors between the reference frame and the subject frame, the effect of motion vectors having a low reliability STi and motion vectors having a small contribution Ki is reduced. In particular, the contribution Ki of the motion vectors included in the region of interest is set at 1 and the contribution Ki of the motion vectors not included in the region of interest is set at 0, and therefore the inter-image motion vector representative value $V_{Frame}$ can be calculated using only the motion vectors included in the region in which the user has an interest.

Further, when the reliability Si is equal to or lower than the predetermined threshold S_Thr, the threshold-processed reliability STi is set at 0, and therefore the effect of motion vectors having a low reliability Si can be eliminated, with the result that the motion vector representative value $V_{Frame}$ can be calculated with a high degree of precision.

Figure 7:
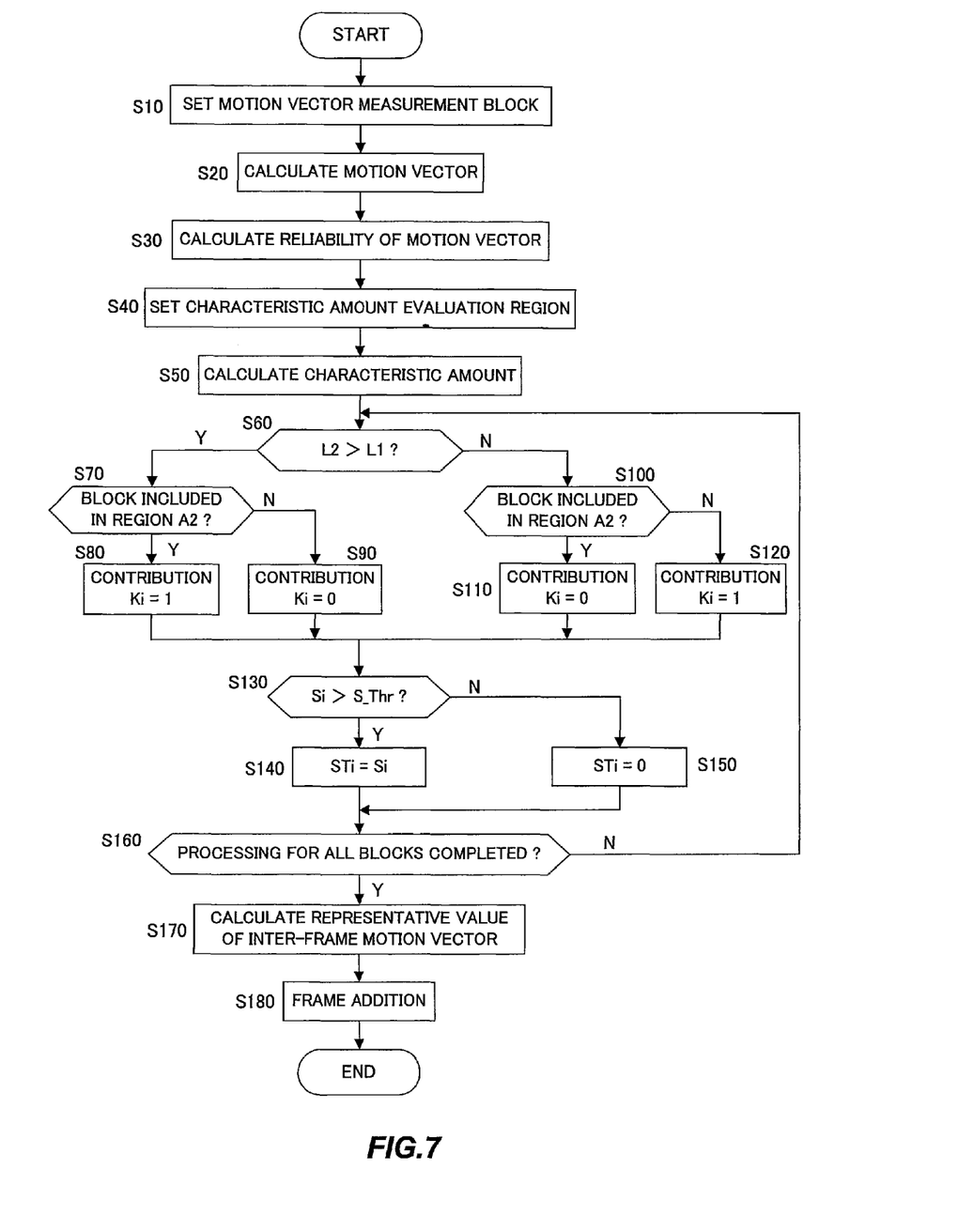
FIG. 7 is a flowchart showing a processing procedure of the processing performed by the image processing apparatus according to the embodiment.

FIG. 7 is a flowchart showing a processing procedure of the processing performed by the image processing apparatus according to this embodiment. In a step S10, the block setting unit 103 sets a plurality of blocks on the reference frame stored in the frame memory 107.

In a step S20, the motion vector calculation unit 104 calculates the motion vector of each block. In a step S30, the motion vector reliability calculation unit 105 calculates the reliability Si of each of the motion vectors determined in the step S20.

In a step S40, the characteristic amount evaluation region setting unit 108 sets the characteristic amount evaluation regions on the reference frame. It is assumed hereafter that the two regions A1, A2 shown in FIG. 4 are set.

In a step S50, the characteristic amount calculation unit 109 calculates the characteristic amounts of the characteristic amount evaluation regions A1, A2 set in the step S40. It is assumed hereafter that the average luminance L1, L2 of the regions A1, A2 is calculated as the characteristic amount, as described above.

Processing from a step S60 to a step S170 is performed by the motion vector integration processing unit 106. In the step S60, the region determination unit 1061 determines whether or not the average luminance L2 of the region A2 is larger than the average luminance L1 of the region A1. When it is determined that the average luminance L2 is larger than the average luminance L1, the region A2 is determined to be the region of interest, whereupon the routine advances to a step S70.

In the step S70, the positional relationship determination unit 1062 determines whether or not the central coordinates (bxi, byi) of the $i^{th}$ block are included in the region A2. As described above, this determination is made on the basis of whether or not the relationship of Equation (6) is established. When it is determined that the central coordinates (bxi, byi) of the $i^{th}$ block are included in the region A2, the routine advances to a step S80, and when it is determined that the central coordinates (bxi, byi) are not included in the region A2, the routine advances to a step S90.

In the step S80, since the central coordinates (bxi, byi) of the $i^{th}$ block are included in the region A2, which is the region of interest, the contribution calculation unit 1063 sets the contribution Ki of the motion vector of the $i^{th}$ block at 1. In the step S90, on the other hand, since the central coordinates (bxi, byi) of the $i^{th}$ block are not included in the region of interest A2, the contribution calculation unit 1063 sets the contribution Ki of the motion vector of the $i^{th}$ block at 0.

When the determination of the step S60 is negative, the region A1 is determined to be the region of interest, whereupon the processing advances to a step S100. In the step S100, the positional relationship determination unit 1062 determines whether or not the central coordinates (bxi, byi) of the $i^{th}$ block are included in the region A2. This determination is also made on the basis of whether or not the relationship of Equation (6) is established. When it is determined that the central coordinates (bxi, byi) of the $i^{th}$ block are included in the region A2, the routine advances to a step S110, and when it is determined that the central coordinates (bxi, byi) are not included in the region A2, the routine advances to a step S120.

In the step S110, since the central coordinates (bxi, byi) of the $i^{th}$ block are included in the region A2, which is not the region of interest, the contribution calculation unit 1063 sets the contribution Ki of the motion vector of the $i^{th}$ block at 0. In the step S120, on the other hand, since the central coordinates (bxi, byi) of the $i^{th}$ block are included in the region A1, which is the region of interest, the contribution calculation unit 1063 sets the contribution Ki of the motion vector of the $i^{th}$ block at 1.

Processing from a step S130 to the step S170 is performed by the integration calculation processing unit 1064. In the step S130, a determination is made as to whether or not the reliability Si of the motion vector of the $i^{th}$ block is higher than the predetermined threshold S_Thr. When the reliability Si is determined to be higher than the predetermined threshold S_Thr, the routine advances to a step S140, and when the reliability Si is determined to be equal to or lower than the predetermined threshold S_Thr, the routine advances to a step S150.

In the step S140, the reliability Si is set as the threshold-processed reliability STi. In the step S150, on the other hand, the threshold-processed reliability STi is set at 0.

In a step S160, a determination is made as to whether or not the processing for calculating the contribution Ki and the threshold-processed reliability STi has been performed on all of the blocks. When it is determined that the processing has not yet been performed on all of the blocks, the routine returns to the step S60, where the processing from the step S60 onward is performed on another block. When it is determined that the processing has been performed on all of the blocks, on the other hand, the routine advances to the step S170.

In the step S170, the representative value $V_{Frame}$ of the motion vectors between the reference frame and the subject frame is calculated using Equation (7) shown above.

In a step S180, the frame addition unit 110 performs frame addition processing on the basis of the image data relating to the reference frame and the subject frame stored in the frame memory 107 and the motion vector representative value $V_{Frame}$ calculated by the motion vector integration processing unit 106. In other words, the reference frame is shifted by the motion vector representative value $V_{Frame}$ and then added to the subject frame.

In the above description, the average luminance L1, L2 of the characteristic amount evaluation regions A1, A2 is used as the characteristic amount, but a number of pixels constituting edges in the characteristic amount evaluation regions may be used instead. An example in which numbers E1, E2 obtained by normalizing the number of pixels constituting edges by pixel counts (surface areas) of the respective regions A1, A2 are used as the characteristic amount will be described below.

In the region in which the user has an interest, observation conditions such as the brightness and the focus of the optical system are favorable, and therefore the number of pixels constituting edges is large. Hence, the region determination unit 1061 compares the edge number E1 of the region A1 with the edge number E2 of the region A2, and then determines that the region A2 is the region of interest when a relationship of E2>E1 is established and that the region A1 is the region of interest when the relationship of E2>E1 is not established. Processing following determination of the regions of interest is identical to the processing described above.

Figure 8:
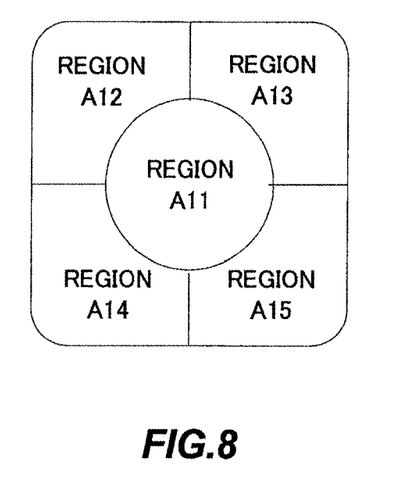
FIG. 8 is a view showing an example of setting five characteristic amount evaluation regions.

In the description heretofore, the two regions A1, A2 shown in FIG. 4 were set as the characteristic amount evaluation regions for simplicity. However, an actual organism has a complicated, non-axial shape, and therefore, as shown in FIG. 8, for example, a larger number of characteristic amount evaluation regions may be set such that the region of interest is limited to a small region. In the example shown in FIG. 8, five characteristic amount evaluation regions A11 to A15 including a single central region A11 and four peripheral regions A12 to A15 positioned on the periphery of the central region A11 are set. As shown in FIG. 8, the region having the highest average luminance or the region having the largest number of pixels constituting edges may be determined as the region of interest likewise in a case where three or more characteristic amount evaluation regions are set. Hence, by reducing the size of a single characteristic amount evaluation region, the range of the region of interest can be reduced, and as a result, the region of interest can be registered even more reliably.

When the region of interest is determined using the average luminance as the characteristic amount, a case in which an excessively bright, saturated region is determined mistakenly as the region of interest, for example, may occur. Meanwhile, when the number of pixels constituting edges is used to determine the region of interest, a case in which noise increases in an extremely dark region such that the noise is counted mistakenly as an edge, leading to an increase in the number of pixels constituting edges and mistaken determination of the corresponding region as the region of interest, may occur. To prevent such cases in which a region is determined mistakenly to be the region of interest, the region of interest may be determined by combining a plurality of characteristic amounts, for example.

An example in which the average luminance of each region and the number of pixels constituting edges are used as characteristic amounts will be described below. When the region of interest is determined from a plurality of characteristic amount evaluation regions, as shown in FIG. 8, using the average luminance of each region and the number of pixels constituting edges, first, threshold processing is performed with respect to the average luminance of each region, for example. When, in the threshold processing, the average luminance of a certain region is equal to or larger than an arbitrary upper limit value Lmax and equal to or lower than an arbitrary lower limit value Lmin, for example, it is determined that this region is not the region of interest. The upper limit value Lmax is a threshold for eliminating an excessively bright region as the region of interest, and the lower limit value Lmin is a threshold for eliminating an excessively dark region as the region of interest.

Next, the region having the largest number of pixels constituting edges, from among the remaining regions, is determined to be the region of interest. When the central coordinates of the subject block are included in the region of interest, the contribution Ki is set at 1, and when the central coordinates are not included in the region of interest, the contribution Ki is set at 0.

It should be noted that a new characteristic amount other than the aforesaid average luminance and number of pixels constituting edges may be introduced. In this case, the newly introduced characteristic amount may be used alone or in combination with the average luminance of the region or the number of pixels constituting edges to determine the region of interest.

Figure 11:
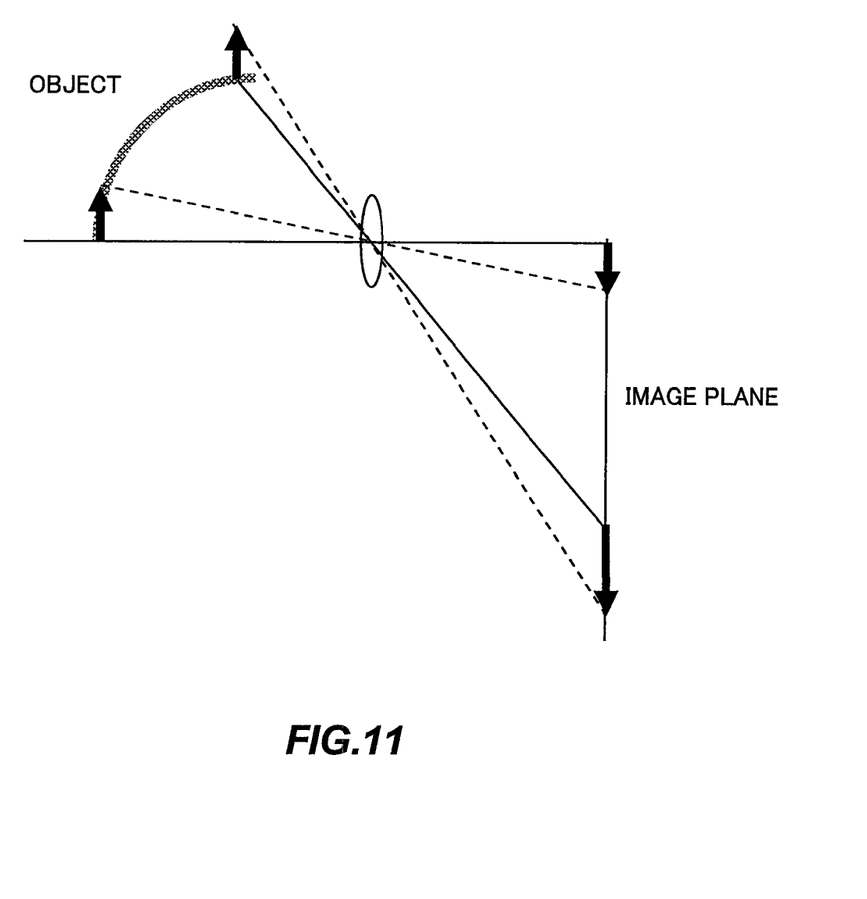
FIG. 11 is a view for explanation of problem of conventional technology.

Here, a case in which an image obtained using a typical endoscope exhibiting large optical system distortion is registered will be considered. In an endoscope used to observe the interior of an organism, the object exists in a position close to the optical system and has a three-dimensional, rather than planar, structure. When an image subjected to distortion correction is used in relation to this type of object, as in the prior art, local variation occurs in an optical magnification due to differences in the distance from the optical system to the object, as shown in FIG. 11, leading to local variation in the motion vector. Further, since the object does not have a constant shape, it is extremely difficult to register the entire image precisely at the same time. Hence, with a conventional technique in which motion vectors are detected using an image in relation to which the distortion of the optical system has already been corrected, the region in which the user has an interest cannot be registered reliably.

With the image processing apparatus according to the embodiment described above, first, the plurality of blocks used to determine the motion vectors are set on the image, whereupon the motion vector of each set block is calculated and the region of interest by user interest is specified. The contribution of each motion vector is then calculated such that the contribution of the motion vectors of the blocks included in the region of interest is larger than the contribution of the motion vectors of the blocks not included in the region of interest, whereupon the inter-image motion vector is determined by integrating the plurality of motion vectors in accordance with the calculated contributions. By calculating the contribution of each block used when integrating the plurality of motion vectors such that the contribution of the motion vectors of the blocks included in the region of interest is larger than the contribution of the motion vectors of the blocks not included in the region of interest, the region in which the user has an interest can be registered reliably.

By setting a plurality of characteristic amount evaluation regions on the image, calculating the characteristic amount indicating the characteristic of each region, and specifying the region of interest from the respective regions on the basis of the calculated characteristic amount, the region in which the user has an interest can be specified with a particularly high degree of precision.

When the average luminance of each region is used as the characteristic amount, the region of interest can be specified with a high degree of precision using a characteristic according to which the luminance of the region in which the user has an interest is high. Further, when the number of pixels constituting edges in each region is calculated as the characteristic amount, the region of interest can be specified with a high degree of precision using a characteristic according to which the number of pixels constituting edges is large in the region in which the user has an interest. Moreover, when both the average luminance of each region and the number of pixels constituting edges are used as characteristic amounts, the region of interest can be specified with an even higher degree of precision than when the average luminance of each region or the number of pixels constituting edges is used alone.

Furthermore, by setting the contribution of the motion vectors of the blocks not included in the region of interest at zero, the inter-image motion vector can be calculated with a high degree of precision using only the motion vectors of the blocks included in the region of interest. As a result, the region in which the user has an interest can be registered reliably.

With the image processing apparatus according to this embodiment, a reliability value indicating the reliability of each motion vector is calculated, and the inter-image motion vector is determined by integrating the plurality of motion vectors in accordance with the contribution and reliability of each motion vector. Therefore, the inter-image motion vector can be determined with an even higher degree of precision.

It should be noted that in the embodiment described above, it is assumed that the processing performed by the image processing apparatus is hardware processing. However, this invention need not be limited to this constitution, and the processing may be performed using software, for example. In this case, the image processing apparatus includes a CPU, a main storage device such as a RAM, and a computer-readable storage medium storing a program for realizing all or a part of the processing described above. Here, this program will be referred to as an image processing program. By having the CPU read the image processing program stored on the storage medium so as to execute information processing/calculation processing, similar processing to that of the image processing apparatus described above is realized.

Here, the computer-readable storage medium is a magnetic disk, a magneto-optical disk, a CD-ROM, a DVD-ROM, a semiconductor memory, or similar. Alternatively, the image processing program may be distributed to a computer via a communication line such that the computer, having received the distributed program, executes the image processing program.

This invention is not limited to the embodiments described above, and may be subjected to various modifications and applications within a scope that does not depart from the technical spirit thereof. For example, a rectangular block is cited as an example of the regions set by the block setting unit 103 in order to determine the motion vectors, but the regions are not limited to rectangular blocks. The regions set by the block setting unit 103 may be referred to as motion vector measurement regions.

What is claimed is:

1. An image processing apparatus that performs image registration processing between a plurality of images through a motion vector calculation, comprising:
    a motion vector measurement region setting unit that sets a plurality of motion vector measurement regions for determining motion vectors on an image;
    a motion vector calculation unit that calculates a motion vector in each of the plurality of motion vector measurement regions;
    a region specification unit that specifies a region of interest by user interest on the image;
    a positional relationship determination unit that determines whether or not central coordinates of each of the plurality of motion vector measurement regions are included within boundaries of the region of interest on the image;
    a contribution calculation unit that calculates a contribution of each motion vector such that the contribution of the motion vector of a motion vector measurement region whose central coordinates are included within the boundaries of the region of interest on the image is larger than the contribution of the motion vector of a motion vector measurement region whose central coordinates are not included within the boundaries of the region of interest on the image;
    a motion vector reliability calculation unit that calculates a reliability value indicating a reliability of the motion vector calculated in each of the plurality of motion vector measurement regions such that when the reliability of the motion vector of a motion vector measurement region is less than a predetermined threshold, the reliability value of the motion vector of the motion vector measurement region is set to zero; and
    a motion vector integration unit that determines an inter-image motion vector by integrating the motion vectors calculated respectively in the plurality of motion vector measurement regions in accordance with the calculated contributions and the calculated reliability values.

2. The image processing apparatus as defined in claim 1, further comprising:
    a region division unit that divides the image into a plurality of regions; and a characteristic amount calculation unit that calculates a characteristic amount indicating a characteristic of each of the plurality of divided regions, wherein the region specification unit specifies the region of interest from among the plurality of divided regions based on the calculated characteristic amounts.

3. The image processing apparatus as defined in claim 2, wherein the characteristic amount calculation unit calculates an average luminance of each of the plurality of divided regions as the characteristic amount.

4. The image processing apparatus as defined in claim 3, wherein the region specification unit specifies a region having a highest average luminance of the average luminance calculated for each of the plurality of divided regions as the region of interest.

5. The image processing apparatus as defined in claim 2, wherein the characteristic amount calculation unit calculates a number of pixels constituting edges included in each region as the characteristic amount.

6. The image processing apparatus as defined in claim 5, wherein the region specification unit specifies a region having a largest number of pixels constituting edges as the region of interest.

7. The image processing apparatus as defined in claim 2, wherein the characteristic amount calculation unit calculates an average luminance of each of the plurality of divided regions and a number of pixels constituting edges included in each region as the characteristic amount.

8. The image processing apparatus as defined in claim 7, wherein the region specification unit specifies a region having a largest number of pixels constituting edges from among regions in which the average luminance is higher than a predetermined lower limit value and lower than a predetermined upper limit value as the region of interest.

9. The image processing apparatus as defined in claim 5, wherein the characteristic amount calculation unit uses the number of pixels constituting edges normalized by a pixel count of each region.

10. The image processing apparatus as defined in claim 2, wherein the region division unit divides the image into a central region positioned in a center of the image and one or more peripheral regions positioned on a periphery of the central region.

11. The image processing apparatus as defined in claim 1, wherein the contribution calculation unit sets the contribution of the motion vector of the motion vector measurement region whose central coordinates are not included within the boundaries of the region of interest on the image at zero, and sets the contribution of the motion vector of the motion vector measurement region whose central coordinates are included within the boundaries of the region of interest on the image at one.

12. An electronic device having the image processing apparatus as defined in claim 1.

13. A computer-readable storage device storing an image processing program for causing a computer to execute registration processing between a plurality of images through a motion vector calculation, the image processing program causing the computer to perform functions comprising:

setting a plurality of motion vector measurement regions for determining motion vectors on an image;

calculating a motion vector in each of the plurality of motion vector measurement regions;

specifying a region of interest by user interest on the image;

determining whether or not central coordinates of each of the plurality of motion vector measurement regions are included within boundaries of the region of interest on the image;

calculating a contribution of each motion vector such that the contribution of the motion vector of a motion vector measurement region whose central coordinates are included within the boundaries of the region of interest on the image is larger than the contribution of the motion vector of a motion vector measurement region whose central coordinates are not included within the boundaries of the region of interest on the image;

calculating a reliability value indicating a reliability of the motion vector calculated in each of the plurality of motion vector measurement regions such that when the reliability of the motion vector of a motion vector measurement region is less than a predetermined threshold, the reliability value of the motion vector of the motion vector measurement region is set to zero; and determining an inter-image motion vector by integrating the motion vectors calculated respectively in the plurality of motion vector measurement regions in accordance with the calculated contributions and the calculated reliability values.

14. An image processing method for performing image registration processing between a plurality of images through a motion vector calculation, comprising:

setting a plurality of motion vector measurement regions for determining motion vectors on an image;

calculating a motion vector in each of the plurality of motion vector measurement regions;

specifying a region of interest by user interest on the image;

determining whether or not central coordinates of each of the plurality of motion vector measurement regions are included within boundaries of the region of interest on the image;

calculating a contribution of each motion vector such that the contribution of the motion vector of a motion vector measurement region whose central coordinates are included within the boundaries of the region of interest on the image is larger than the contribution of the motion vector of a motion vector measurement region whose central coordinates are not included within the boundaries of the region of interest on the image;

calculating a reliability value indicating a reliability of the motion vector calculated in each of the plurality of motion vector measurement regions such that when the reliability of the motion vector of a motion vector measurement region is less than a predetermined threshold, the reliability value of the motion vector of the motion vector measurement region is set to zero; and determining an inter-image motion vector by integrating the motion vectors calculated respectively in the plurality of motion vector measurement regions in accordance with the calculated contributions and the calculated reliability values.

* * * * *